(12) United States Patent
Park et al.

(10) Patent No.: US 12,140,206 B1
(45) Date of Patent: Nov. 12, 2024

(54) UNIVERSAL DRIVING DEVICE

(71) Applicants: HYUNDAI MOTOR COMPANY, Seoul (KR); KIA CORPORATION, Seoul (KR)

(72) Inventors: Jong Sool Park, Hwaseong-si (KR); Woo Hyun Lim, Incheon (KR); Yeo Hae Lee, Gunpo-si (KR); Kyoung Chul Min, Hwaseong-si (KR); Dae In Lee, Anyang-si (KR); Ki Seok Kim, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/504,763

(22) Filed: Nov. 8, 2023

(30) Foreign Application Priority Data

Aug. 10, 2023 (KR) .................. 10-2023-0104901

(51) Int. Cl.
| | | |
|---|---|---|
| *F16H 1/46* | (2006.01) | |
| *F16H 1/28* | (2006.01) | |
| *F16H 57/08* | (2006.01) | |

(52) U.S. Cl.
CPC ............. *F16H 1/46* (2013.01); *F16H 57/082* (2013.01); *F16H 2001/2881* (2013.01); *F16H 2200/201* (2013.01)

(58) Field of Classification Search
CPC .. F16H 1/46; F16H 57/082; F16H 2001/2881; F16H 2200/201; F16H 1/2836; F16H 1/2845; F16H 48/11; F16H 1/48
See application file for complete search history.

(56) References Cited

U.S. PATENT DOCUMENTS

| | | | | |
|---|---|---|---|---|
| 2,144,964 | A * | 1/1939 | De Falco | ................ F16H 1/006 74/411 |
| 3,955,435 | A * | 5/1976 | Arick | ........................ F16H 1/32 74/411 |
| 11,773,944 | B1* | 10/2023 | Harmon-Moore | ........ F16H 1/46 475/337 |
| 2012/0015771 | A1* | 1/2012 | Haeusler | .............. B60K 17/046 475/183 |

FOREIGN PATENT DOCUMENTS

| | | |
|---|---|---|
| KR | 2023-0013552 A | 1/2023 |
| KR | 2023-0140062 A | 10/2023 |
| KR | 2023-0140063 A | 10/2023 |
| KR | 2023-0140064 A | 10/2023 |
| KR | 2023-0140065 A | 10/2023 |

* cited by examiner

*Primary Examiner* — Stacey A Fluhart
*Assistant Examiner* — Aimee Tran Nguyen
(74) *Attorney, Agent, or Firm* — MCDONNELL BOEHNEN HULBERT & BERGHOFF LLP

(57) ABSTRACT

A universal driving device includes a ring gear, a sun gear installed such that the shaft distance between a rotation shaft of the sun gear and a rotation shaft of the ring gear is changeable, and a split gear disposed between the sun gear and the ring gear, and configured to split power, received from the sun gear through one path, into multiple paths and transmit the power to the ring gear.

20 Claims, 7 Drawing Sheets

UNIVERSAL DRIVING DEVICE

CROSS REFERENCE TO RELATED APPLICATIONS

This application is based on and claims priority under 35 U.S.C. § 119 to Korean Patent Application No. 10-2023-0104901, filed on Aug. 10, 2023, in the Korean Intellectual Property Office, the disclosure of which is herein incorporated by reference in its entirety.

BACKGROUND

1. Field

The present disclosure relates to a driving device that receives power from a rotational power source, such as a motor, and outputs a shifted rotational force.

2. Description of the Prior Art

A driving device for a vehicle transmits power from a rotational power source such as an engine or a motor to wheels to drive the vehicle.

Recently, an in-wheel motor type driving device in which a motor is directly installed on a driving wheel has been proposed. However, the in-wheel motor driving device is not widely used due to a motor durability problem, a ride comfort problem caused by increased unsprung mass, etc.

The foregoing described as the background art is intended merely to aid in the understanding of the background of the present disclosure, and is not intended to mean that the present disclosure falls within the purview of the related art already known to those skilled in the art.

SUMMARY

An aspect of the present disclosure is to provide, as a driving device for receiving power from a rotational power source such as a motor and outputting a shifted rotational force, a universal driving device wherein, when the universal driving device is applied to a vehicle, improved uphill-traveling and acceleration-traveling performance can be ensured by appropriately reducing the speed of the input power, a power source such as a motor can be installed separately from a wheel, which is subject to severe shock and vibration, thereby improving the durability of the power source, excellent ride comfort can be ensured through reduction in unsprung mass of the vehicle compared with an in-wheel motor driving device, power can be continuously transmitted from the power source in response to the vertical movement of the wheel without using a constant velocity joint, and as a result, the space between the power source and the wheel can be reduced, thereby ultimately ensuring excellent space utilization between left and right wheels.

Another aspect of the present disclosure is to provide a universal driving device in which the high-speed output of a motor can be reduced through a high gear ratio, thereby enabling a relatively lightweight motor to be used to provide sufficient torque required by a vehicle and ensuring higher operational stability and durability.

In view of the foregoing, a universal driving device of the present disclosure may include a ring gear, a sun gear installed such that the shaft distance between a rotation shaft of the sun gear and a rotation shaft of the ring gear is changeable, and a split gear disposed between the sun gear and the ring gear, and configured to split power, received from the sun gear through one path, into multiple paths and transmit the power to the ring gear.

The universal driving device may include multiple final pinions connected to the split gear while being engaged with the ring gear so as to transmit the power from the split gear to the ring gear through the multiple paths.

The universal driving device may include a carrier configured to support a shaft of the split gear and shafts of the final pinions so as to continuously keep the final pinions engaged with the ring gear.

The sun gear and the split gear may be connected to each other by multiple links connected to each other at an angle which changes depending on a change in the inter-shaft distance between the sun gear and the ring gear.

The multiple links may include a first link connected to a rotation shaft of the sun gear and a second link configured to connect the split gear to the first link, and a joint pinion used for power transmission between the sun gear and the split gear may be installed at a portion in which the first link is connected to the second link.

The sun gear and the split gear may be connected to each other such that continuous power transmission is capable of being performed by a gear train including the joint pinion.

Multiple branch intermediate gears configured to transmit power from the split gear to the final pinions may be disposed between the split gear and the multiple final pinions.

The sun gear, the joint pinion, and the split gear may all be configured to have an equal number of teeth.

The final pinions may be configured to have an equal number of teeth to the split gear.

The final pinions may be configured to have more teeth than the split gear, and the branch intermediate gears configured to connect the split gear to the final pinions may be configured to have fewer teeth than the split gear.

A first intermediate pinion having a shaft supported by the first link may be disposed between the sun gear and the joint pinion, and a second intermediate pinion having a shaft supported by the second link may be disposed between the joint pinion and the split gear.

The multiple links may include a first link connected to the rotation shaft of the sun gear and a second link connected to the first link and connected to the shaft of the split gear, and the first link and the second link may be equipped with shafts of a series of gears configured to transmit power from the sun gear to the split gear.

Among the series of gears configured to transmit power from the sun gear to the split gear, gears located at even-numbered positions from the sun gear may be configured to have an equal number of teeth to the sun gear.

A gear located second from the sun gear may be the joint pinion installed concentrically with the shafts on the first link and the second link, and a gear located fourth from the sun gear may be the split gear.

A first intermediate pinion having a shaft installed on the first link may be engaged with the sun gear and the joint pinion, and a second intermediate pinion having a shaft installed on the second link may be engaged with the joint pinion and the split gear.

Multiple split gears may be disposed along a circumferential direction around the sun gear.

Furthermore, in order to achieve the aspects as described above, a universal driving device of the present disclosure may include a ring gear, a sun gear installed such that the shaft distance between the sun gear and the ring gear is changeable, a first pinion engaged with the sun gear, a second pinion engaged with the first pinion, a third pinion engaged with the second pinion, a fourth pinion engaged with the third pinion, multiple fifth pinions engaged with the fourth pinion, sixth pinions engaged with the multiple fifth pinions, respectively, and engaged with the ring gear, a carrier configured to support shafts of the fourth pinion, the fifth pinions, and the sixth pinions so that the shafts do not revolve around the center of the ring gear, a first link installed to support shafts of the sun gear, the first pinion, and the second pinion, and a second link installed to support shafts of the second pinion, the third pinion, and the fourth pinion.

The sun gear, the second pinion, and the fourth pinion may all be configured to have an equal number of teeth.

The sixth pinions may be configured to have an equal number of teeth to the fourth pinion.

The number of teeth of each of the sixth pinions may be different from the number of teeth of the fourth pinion, and the number of teeth of each of the fifth pinions may be less than the number of teeth of the fourth pinion.

The present disclosure may provide, as a driving device for receiving power from a rotational power source such as a motor and outputting a shifted rotational force, a universal driving device wherein, when the universal driving device is applied to a vehicle, excellent uphill-traveling and acceleration-traveling performance can be ensured by appropriately reducing the speed of the input power, a power source such as a motor can be installed separately from a wheel, which is subject to severe shock and vibration, thereby improving the durability of the power source, excellent ride comfort can be ensured due to reduced unsprung mass of the vehicle compared with an in-wheel motor driving device, power can be continuously transmitted from the power source in response to the vertical movement of the wheel without using a constant velocity joint, and as a result, the space between the power source and the wheel can be reduced, thereby ultimately ensuring excellent space utilization between left and right wheels.

The present disclosure may provide a universal driving device in which the high-speed output of a motor can be reduced through a high gear ratio, thereby enabling a relatively lightweight motor to be used to provide sufficient torque required by a vehicle and ensuring higher operational stability and durability.

BRIEF DESCRIPTION OF THE FIGURES

The above and other aspects, features, and advantages of the present disclosure will be more apparent from the following detailed description taken in conjunction with the accompanying drawings, in which.

DETAILED DESCRIPTION

Hereinafter, embodiments disclosed in the present specification will be described in detail with reference to the accompanying drawings, and the same or similar elements are given the same and similar reference numerals, so duplicate descriptions thereof will be omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Referring to FIGS. 1 to 7, a universal driving device U of the present disclosure includes a ring gear R, a sun gear S installed so that the shaft distance between a rotation shaft of the ring gear R and the sun gear is changeable, and a split gear 1 disposed between the sun gear S and the ring gear R and configured to split power, received from the sun gear S through one path, into multiple paths and transmit the power to the ring gear R.

That is, the universal driving device of the present disclosure is installed such that: the inter-shaft distance between the sun gear S and the ring gear R is allowed to be changed; power transmitted from the sun gear S may be continuously transmitted to the ring gear R; and the split gear 1 may receive the power from the sun gear S through one path and transmit the received power to the ring gear R through multiple paths.

The universal driving device U of the present disclosure includes multiple final pinions 3 connected to the split gear 1 while being engaged with ring gear R so as to transmit power from the split gear 1 to the ring gear R through multiple paths.

That is, the universal driving device U is configured such that power transmitted from the sun gear S to the split gear 1 is divided into multiple paths in the split gear 1 and ultimately transmitted to the multiple final pinions 3 and then to the ring gear R.

A carrier C supports the shaft of the split gear 1 and the shafts of the final pinions 3 so as to keep the final pinions 3 continuously engaged with the ring gear R.

Figure 5:
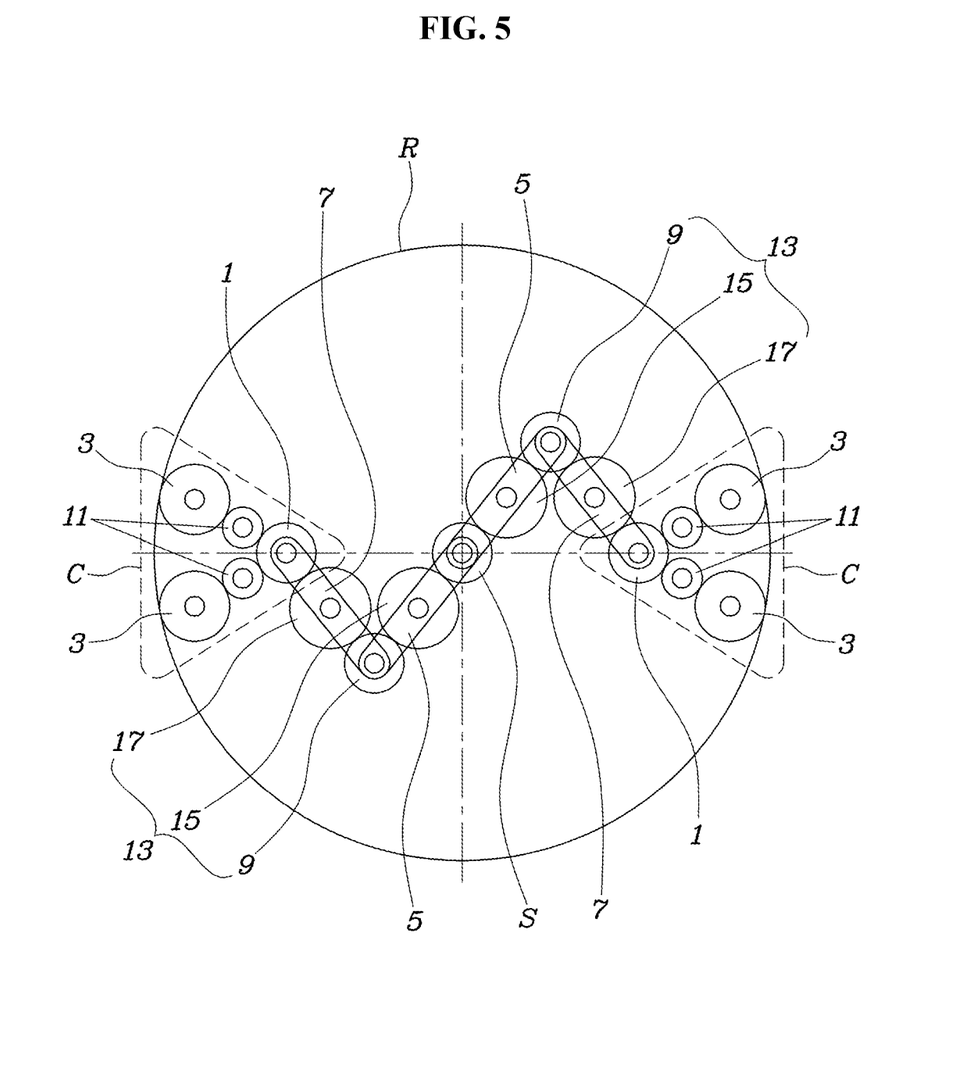
FIG. 5 illustrates another embodiment of a universal driving device according to the present disclosure.

For reference, when the universal driving device of the present disclosure is applied to a vehicle as shown in FIG. 5, a wheel W may be mounted to the ring gear R, a power source such as a motor M may be connected to the sun gear S, and the carrier C may be supported on the vehicle body by a suspension device or the like so as to be able to move up and down together with the ring gear R with respect to a vehicle body, resulting in implementing a structure in which the ring gear R is supported by the suspension device or the like so as to be able to move up and down with respect to the vehicle body through the carrier C.

Figure 1:
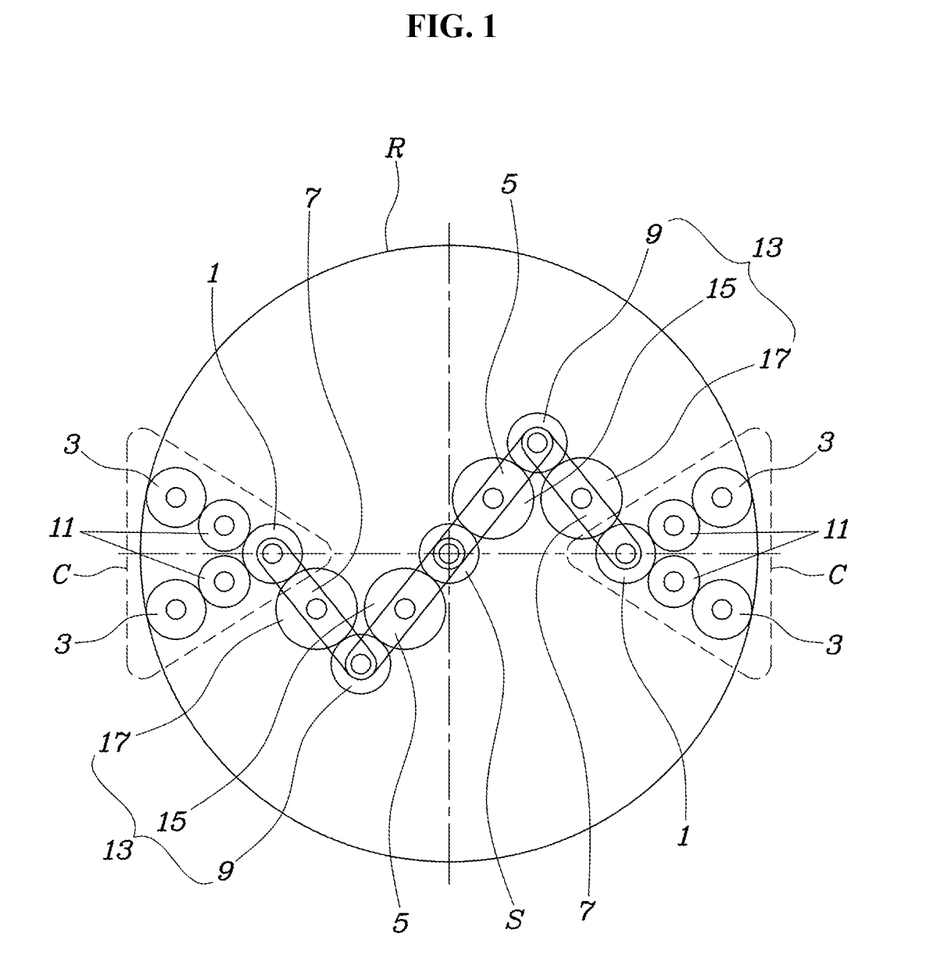
FIG. 1 illustrates a universal driving device according to the present disclosure.

In FIG. 1, the carriers C as described above are shown with dotted lines in two separate parts in order to avoid drawing complexity, but it is reasonable to understand that the carriers C are connected to each other to form a single body.

The sun gear S and the split gear 1 are connected by multiple links connected to each other at an angle which change depending on the inter-shaft distance between the sun gear S and the ring gear R.

In other words, the universal driving device of the present disclosure is configured to allow a change in the inter-shaft distance between the sun gear S and the ring gear R but continuously maintain a connected state between the sun gear S and the ring gear R so as to enable power transmission therebetween. To this end, the multiple links connected to each other at an angle changing as described above are used.

The multiple links include a first link 5 connected to the rotation shaft of the sun gear S and a second link 7 connecting the first link 5 to the split gear 1. A joint pinion 9 used for power transmission between the sun gear S and the split gear 1 is installed at a portion in which the first link 5 is connected to the second link 7.

The sun gear S and the split gear are connected to each other so that continuous power transmission can be performed by a gear train including the joint pinion 9.

Furthermore, multiple branch intermediate gears 11 configured to transmit power from the split gear 1 to the final pinions 3 are arranged between the split gear 1 and the multiple final pinions 3.

Thus, power transmitted from the sun gear S is transmitted to the split gear 1 by one gear train 13 including the joint pinion 9, the power transmitted to the split gear 1 is transmitted to the multiple final pinions 3 via the multiple branch intermediate gears 11, and ultimately the power is transmitted to the ring gear R through multiple paths.

Power input into the sun gear S is transmitted to the ring gear R via the gear train 13 including the joint pinion 9, the split gear 1, the multiple branch intermediate gears 11, and the multiple final pinions 3, making it possible to realize a high gear ratio of 10 or more.

Therefore, even when a relatively small-capacity motor M is connected to the sun gear S, the relatively small-capacity motor M may be configured to output the driving force, which is required by a vehicle or the like, through the ring gear R by decelerating at a high gear ratio, and is thus advantageous for reducing the cost and weight of the vehicle.

Furthermore, as described above, by using the split gear 1, the multiple branch intermediate gears 11, and the multiple final pinions 3 to transmit power to the ring gear R, the amount of deformation of the ring gear R may be reduced through the effect of distributing a load acting on the ring gear R, so that more stable operation may be secured and the durability of the ring gear R may be improved.

The sun gear S, the joint pinion 9, and the split gear 1 all have the same number of teeth.

When the sun gear S, the joint pinion 9, and the split gear 1 have the same number of teeth as described above, the relative phase between the sun gear S and the ring gear R is kept constant during the relative motion of the rotation shafts of the sun gear S and the ring gear R in the up-downward and left-right directions.

Figure 2:
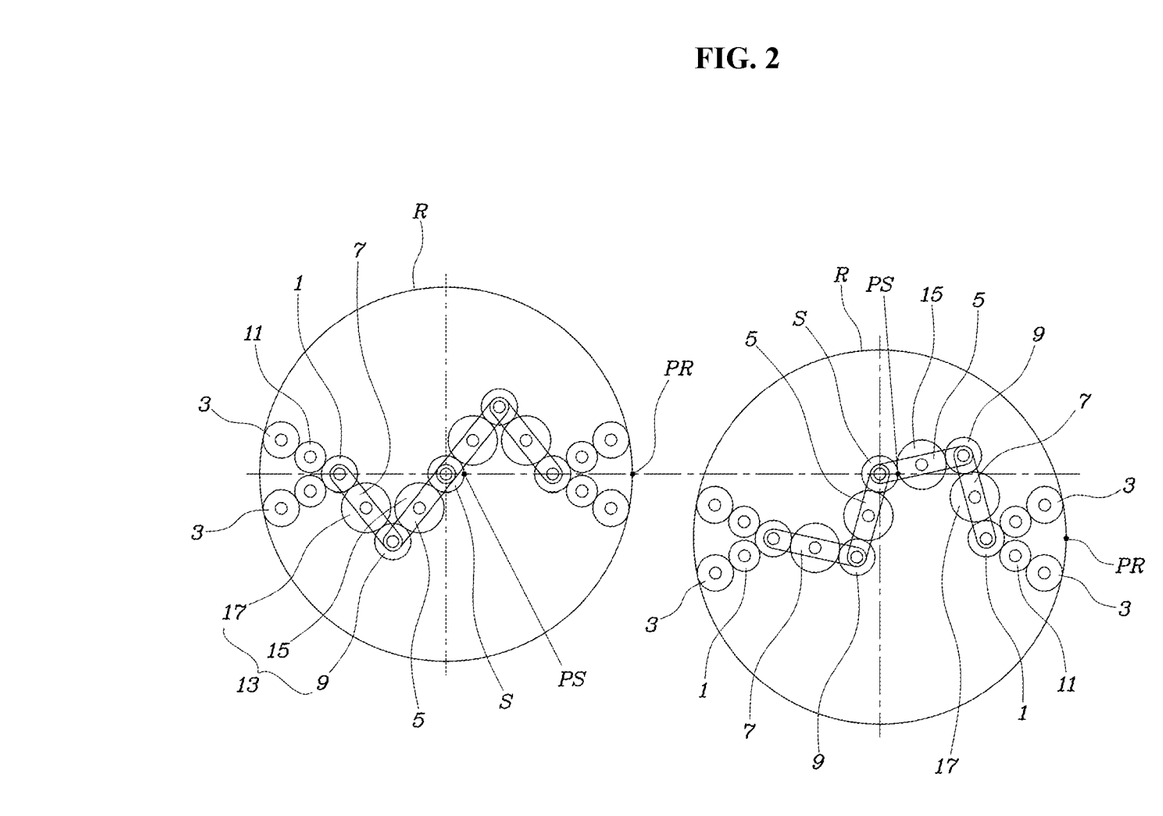
FIG. 2 illustrates a state in which a ring gear is relatively moved down compared with the state in FIG. 1.
Figure 3:
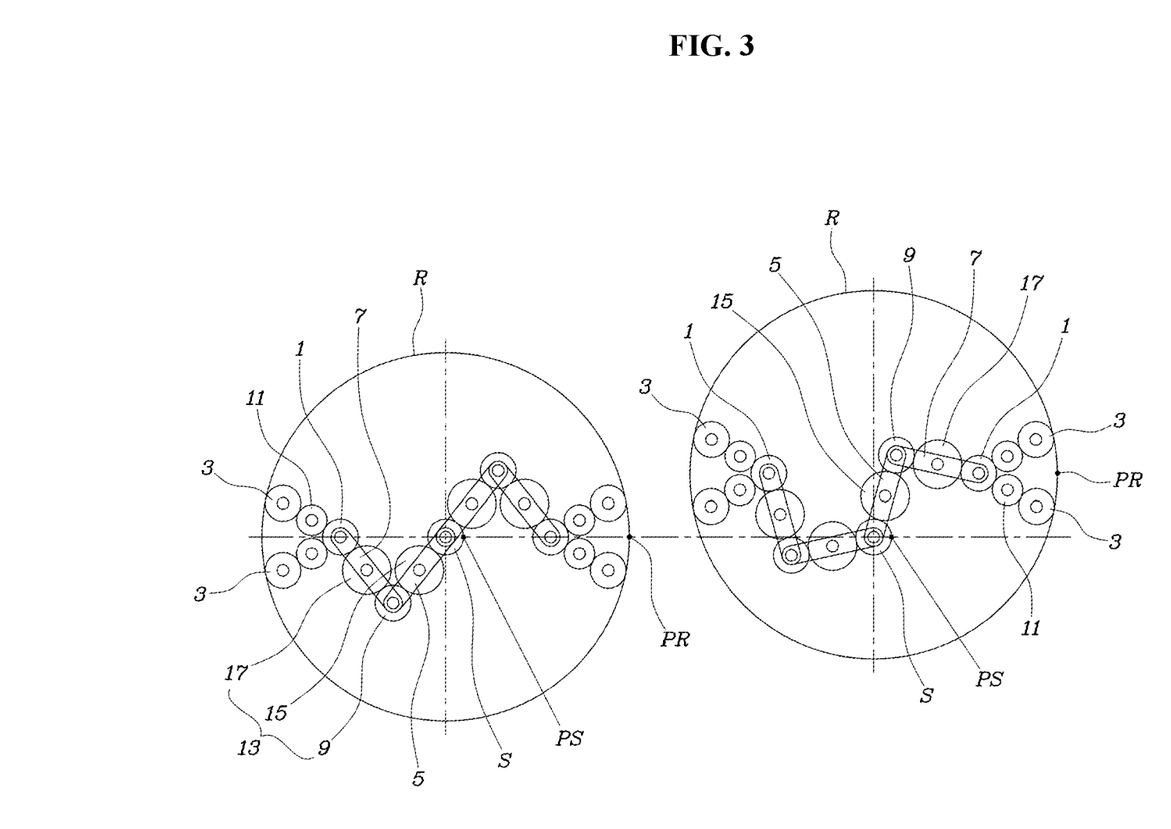
FIG. 3 illustrates a state in which a ring gear is relatively moved up compared with the state in FIG. 1.
Figure 4:
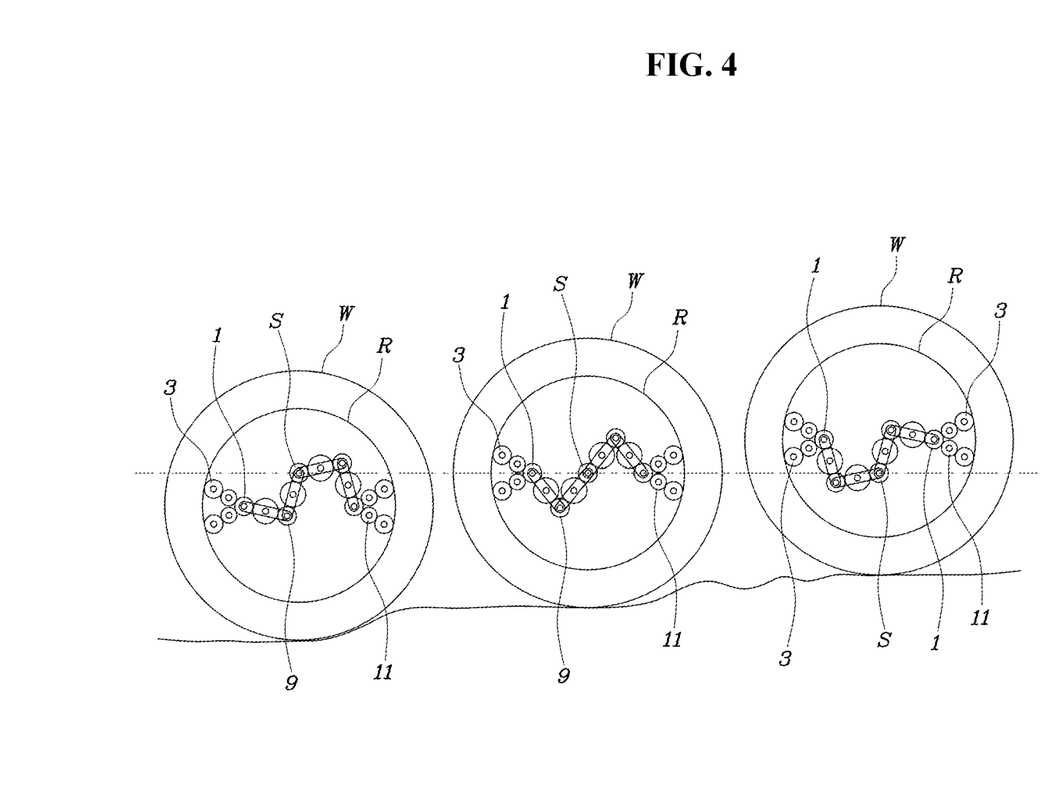
FIG. 4 illustrates an example in which the universal driving device in FIG. 1 has been applied to a vehicle.

Here, the fact that the relative phase between the sun gear S and the ring gear R is kept constant during the relative motion of the sun gear S and the ring gear R may imply that the rotational phases of points PS and PR marked on the sun gear S and the ring gear R, respectively, in FIGS. 2 and 3 are kept constant even during the upward/downward or leftward/rightward movement of the ring gear R with respect to the sun gear S.

In other words, when the sun gear S, the joint pinion 9, and the split gear 1 have the same number of teeth, there is no relative rotation of the sun gear S and the ring gear R due to a change in the inter-shaft distance between the sun gear S and the ring gear R.

Therefore, power transmitted from the sun gear S is transmitted to the ring gear R at a constant speed, regardless of changes in the inter-shaft distance between the sun gear S and the ring gear R. Thus, in case that the universal driving device U of the present disclosure is applied to a vehicle, the phase of the motor M connected with the sun gear S does not change even if the ring gear R and the wheel W move up and down or left and right with respect to the rotation shaft of the motor M or the sun gear S when power generated by the motor M is transmitted from the sun gear S to the wheel W through the ring gear R. Therefore, output torque may be controlled stably through the motor M, thereby enabling stable traveling of the vehicle.

In case that the above conditions are not met and that either the sun gear S, the joint pinion 9, or the split gear 1 has a different number of teeth, the ring gear R and wheel W may move up and down with respect to the sun gear S and the motor M even when the motor M rotates at a constant speed as described above, whereby the relative rotation of the sun gear S and the ring gear R may occur, causing vibrations in the traveling direction of the vehicle, known as a U-joint vibration.

In the embodiments shown in FIGS. 1 to 4, the final pinions 3 each have the same number of teeth as the split gear 1.

Even when the final pinions 3 each do not necessarily have the same number of teeth as the split gears 1, the relative rotation of the sun gear S and the ring gear R due to a change in the inter-shaft distance between the sun gear S and the ring gear R may not occur.

This is because, on the power transmission path from the split gear 1 to the ring gear R, a relative rotation angle is constant without any change even when the inter-shaft distance between the sun gear S and the ring gear R changes.

In other words, when only the sun gear S, the joint pinion 9, and the split gear 1 have the same number of teeth, the relative rotation of the sun gear S and the ring gear R due to the change of the inter-shaft distance between the sun gear S and the ring gear R does not occur regardless of what number of teeth gears connected to the ring gear R and disposed after the split gear 1 have.

Here, when the final pinions 3 have the same number of teeth as the split gear 1, there may be benefits from common use of components.

Figure 6:
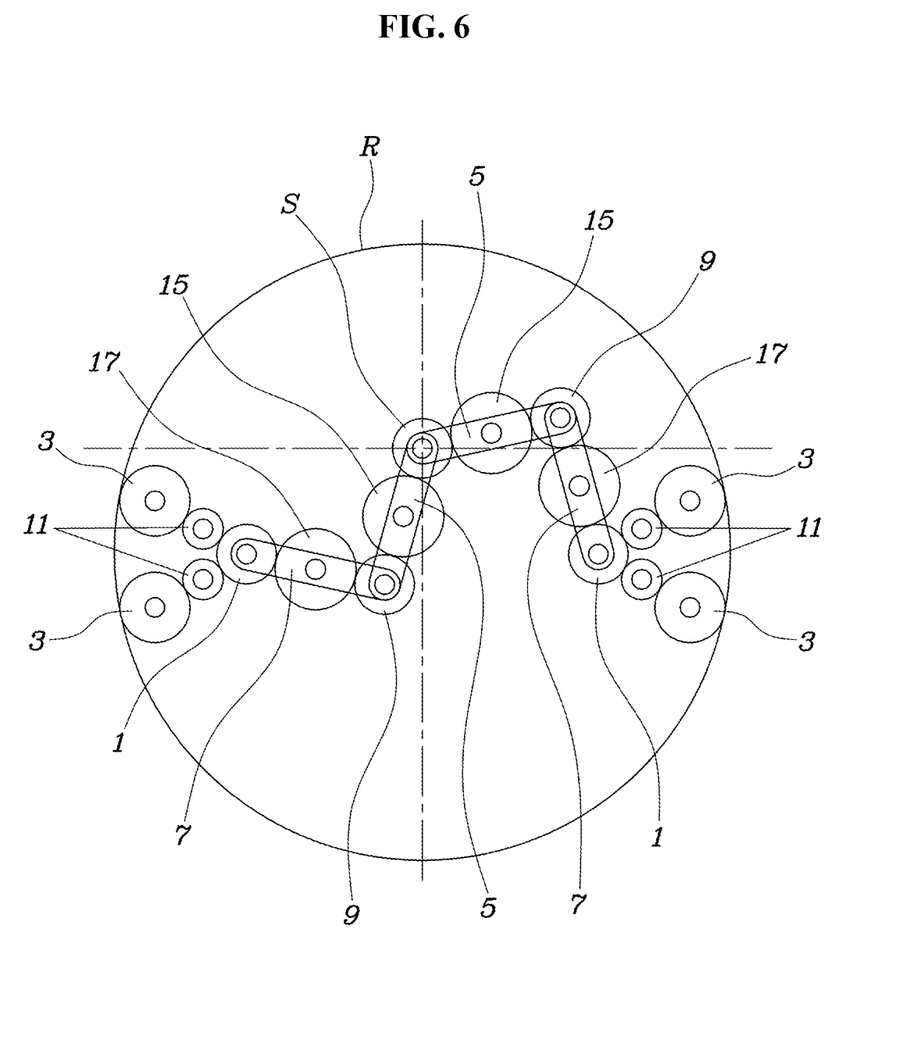
FIG. 6 illustrates a state in which a ring gear is relatively moved down compared with the state in FIG. 5.

In the embodiments shown in FIGS. 5 and 6, the final pinions 3 have more teeth than the split gear 1, and the branch intermediate gears 11 connecting the split gear 1 to the final pinions 3 have fewer teeth than the split gear 1.

In this case, it is advantageous that interference between the multiple branch intermediate gears 11 located adjacent to each other while being engaged with the single split gear 1 may be effectively avoided, and interference between the branch intermediate gears 11 and the gear train 13 including the joint pinion 9 may also be easily avoided by design.

A first intermediate pinion 15 having a shaft supported by the first link 5 is disposed between the sun gear S and the joint pinion 9, and a second intermediate pinion 17 having a shaft supported by the second link 7 is disposed between the joint pinion 9 and the split gear 1.

In other words, the gear train 13, including the joint pinion 9, includes the first intermediate pinion 15, the joint pinion 9, and the second intermediate pinion 17, and is configured to continuously transmit power from the sun gear S to the split gear 1.

The shafts of a series of gears configured to transmit power from the sun gear S to the split gear 1 are installed on the first link 5 and the second link 7.

That is, the shafts of the sun gear S, the first intermediate pinion 15, and the joint pinion 9 are installed in order on the first link 5, and the shafts of the joint pinion 9, the second intermediate pinion 17, and the split gear 1 are installed in order on the second link 7.

Therefore, structurally, the sun gear S and the joint pinion 9 are engaged with the first intermediate pinion 15 having a shaft installed on the first link 5, and the joint pinion 9 and the split gear 1 are engaged with the second intermediate pinion 17 having a shaft installed on the second link 7.

Among the series of gears configured to transmit power from the sun gear S to the split gear 1, gears located at even-numbered positions from the sun gear S have the same number of teeth as the sun gear S.

That is, in the present disclosure, a gear located second from the sun gear S is the joint pinion 9 installed concentrically with the shafts of the first link 5 and the second link 7, and a gear located fourth from the sun gear S is the split gear 1, so that the joint pinion 9 and the split gear 1 have the same number of teeth as the sun gear S, as described above.

Multiple split gears 1 may be arranged along the circumferential direction around the sun gear S.

In both the embodiment of FIG. 1 and the embodiment of FIG. 5, two split gears 1 are arranged along the circumferential direction around on the sun gear S, thereby ensuring structural stability between the sun gear S and the ring gear R.

The universal driving device of the present disclosure, as described above, may also be expressed as follows.

That is, a universal driving device of the present disclosure may include a ring gear R, a sun gear S installed such that the shaft distance between the sun gear S and the ring gear R is changeable, a first pinion engaged with the sun gear S, a second pinion engaged with the first pinion, a third pinion engaged with the second pinion, a fourth pinion engaged with the third pinion, multiple fifth pinions engaged with the fourth pinion, sixth pinions engaged with the multiple fifth pinions, respectively, and engaged with the ring gear R, a carrier C configured to support the shafts of the fourth pinion, the fifth pinions, and the sixth pinions so that the shafts do not revolve around the center of the ring gear R, a first link 5 installed to support the shafts of the sun gear S, the first pinion, and the second pinion, and a second link 7 installed to support the shafts of the second pinion, the third pinion, and the fourth pinion.

The sun gear S, the second pinion, and the fourth pinion are all configured to have the same number of teeth.

The first pinion corresponds to the first intermediate pinion 15, the second pinion corresponds to the joint pinion 9, the third pinion corresponds to the second intermediate pinion 17, the fourth pinion corresponds to the split gear 1, the fifth pinions correspond to the branch intermediate gears 11, and the sixth pinions correspond to the final pinions 3.

The sixth pinions may each be configured to have the same number of teeth as the fourth pinion.

Furthermore, the number of teeth of each of the sixth pinion may be different from the number of teeth of the fourth pinion, and in this case, the number of teeth of the fifth opinion is preferably less than the number of teeth of the fourth opinion.

Figure 7:
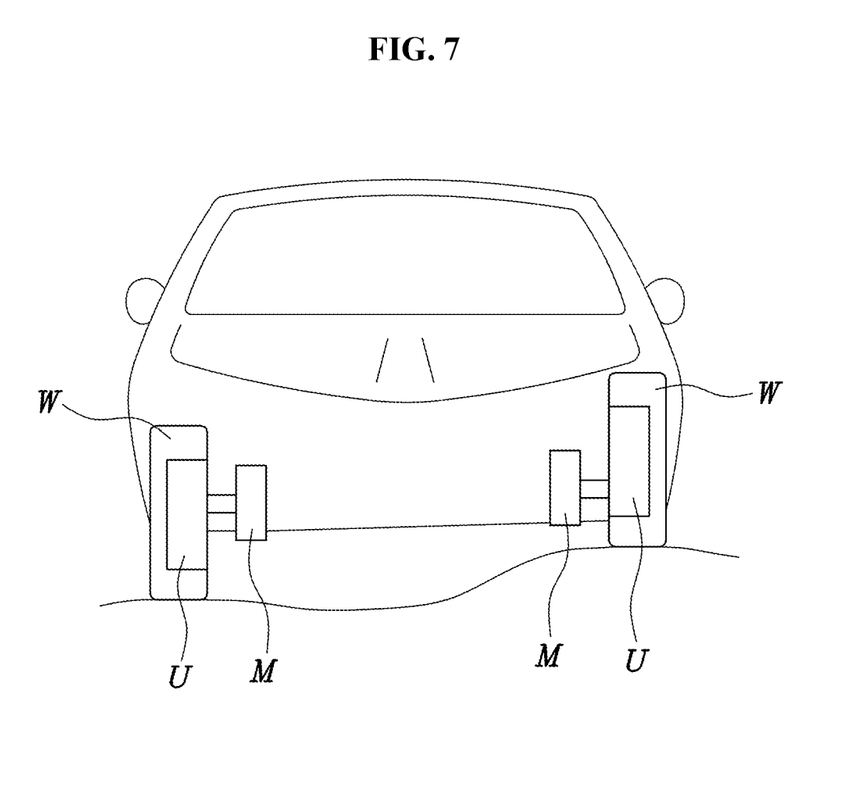
FIG. 7 illustrates an example in which the embodiment of the present disclosure in FIG. 1 or 5 has been applied to a vehicle.

Referring to FIG. 7, the rotation shaft of a motor M is connected to the sun gear S, and a wheel W is connected to the ring gear R, whereby the universal driving device U of the present disclosure may be used as a driving device for a vehicle.

In this case, power input into the sun gear S may be configured to be reduced with a high gear ratio before reaching the ring gear R, thus ensuring the improved uphill-traveling and acceleration-traveling performance of the vehicle.

In addition, the motor M may be installed separately outside the wheel W, which is subjected to severe shock and vibration, instead of being installed inside the wheel W, thereby improving the durability of the motor M and ensuring excellent ride comfort through reduction in the unsprung mass of the vehicle compared with an in-wheel motor driving device.

Furthermore, as described above, it is possible to transmit constant power to the sun gear S connected to the power source while allowing the upward/downward movement of the ring gear R to which the wheel W is connected, thereby enabling continuously power transmission from the power source in response to the upward/downward and leftward/rightward right movements of the wheel W without using a conventional constant velocity joint or the like. As a result, the space between the power source and the wheel W may be reduced, thereby ultimately making it possible to produce a vehicle with excellent space utilization between a left wheel W and a right wheel W.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

The invention claimed is:

1. A universal driving device comprising:
   a ring gear;
   a sun gear positioned such that a distance between a rotation shaft of the sun gear and a rotation shaft of the ring gear is changeable; and
   at least one split gear disposed between the sun gear and the ring gear, each split gear being configured to split power received from the sun gear through one path, into multiple paths, and to transmit the power to the ring gear.

2. The universal driving device of claim 1, comprising a plurality of final pinions connected to each split gear and being engaged with the ring gear to transmit the power from each split gear to the ring gear through the multiple paths.

3. The universal driving device of claim 2, comprising a carrier configured to support a shaft of each split gear and a shaft of each of the plurality of final pinions to continuously keep the plurality of final pinions engaged with the ring gear.

4. The universal driving device of claim 3, wherein the sun gear and each split gear are connected by multiple links connected to each other at an angle which changes depending on a change in the inter-shaft distance between the sun gear and the ring gear.

5. The universal driving device of claim 4, wherein the multiple links comprise a first link connected to a rotation shaft of the sun gear, and a second link configured to connect each split gear to the first link; and
    wherein a joint pinion used for power transmission between the sun gear and each split gear is installed at a position where the first link is connected to the second link.

6. The universal driving device of claim 5, wherein the sun gear and each split gear are connected to enable continuous power transmission by a gear train comprising the joint pinion.

7. The universal driving device of claim 6, wherein a plurality of branch intermediate gears configured to transmit power from each split gear to the plurality of final pinions are disposed between each split gear and the plurality of final pinions.

8. The universal driving device of claim 7, wherein the sun gear, the joint pinion, and each split gear are all configured to have an equal number of teeth.

9. The universal driving device of claim 8, wherein the plurality of final pinions are configured to have an equal number of teeth to each split gear.

10. The universal driving device of claim 8, wherein the plurality of final pinions are configured to have more teeth than each split gear, and
    wherein the plurality of branch intermediate gears configured to connect the split gear to the plurality of final pinions are configured to have fewer teeth than the split gear.

11. The universal driving device of claim 6, wherein a first intermediate pinion having a shaft supported by the first link is positioned between the sun gear and the joint pinion, and
    a second intermediate pinion having a shaft supported by the second link is positioned between the joint pinion and each split gear.

12. The universal driving device of claim 4, wherein the multiple links comprise a first link connected to the rotation shaft of the sun gear, and a second link connected to the first link and connected to the shaft of each split gear, and
    wherein the first link and the second link include shafts of a series of gears configured to transmit power from the sun gear to each split gear.

13. The universal driving device of claim 12, wherein among the series of gears configured to transmit power from the sun gear to each split gear, gears located at even-numbered positions from the sun gear are configured to have an equal number of teeth to the sun gear.

14. The universal driving device of claim 13, wherein a gear located second from the sun gear is the joint pinion installed concentrically with the shafts on the first link and the second link, and a gear located fourth from the sun gear is each split gear.

15. The universal driving device of claim 14, wherein a first intermediate pinion having a shaft installed on the first link is engaged with the sun gear and the joint pinion, and
    a second intermediate pinion having a shaft installed on the second link is engaged with the joint pinion and each split gear.

16. The universal driving device of claim 3, wherein multiple split gears are disposed along a circumferential direction around the sun gear.

17. A universal driving device comprising:
    a ring gear;
    a sun gear positioned such that a distance between the sun gear and the ring gear is changeable;
    a first pinion engaged with the sun gear;
    a second pinion engaged with the first pinion;
    a third pinion engaged with the second pinion;
    a fourth pinion engaged with the third pinion;
    a plurality of fifth pinions engaged with the fourth pinion;
    a plurality of sixth pinions engaged with the plurality of fifth pinions, and engaged with the ring gear;
    a carrier configured to support a shaft of the fourth pinion, a plurality of shafts of the plurality of fifth pinions, and a plurality of shafts of the plurality of sixth pinions so that the shaft of the fourth pinion, the plurality of shafts of the plurality of fifth pinions, and the plurality of shafts of the plurality of sixth pinions do not revolve around a center of the ring gear;
    a first link configured to support shafts of the sun gear, the first pinion, and the second pinion; and
    a second link configured to support shafts of the second pinion, the third pinion, and the fourth pinion.

18. The universal driving device of claim 17, wherein the sun gear, the second pinion, and the fourth pinion are all configured to have an equal number of teeth.

19. The universal driving device of claim 18, wherein the plurality of sixth pinions are configured to have an equal number of teeth as the fourth pinion.

20. The universal driving device of claim 18, wherein a number of teeth of each of the plurality of sixth pinions is different from a number of teeth of the fourth pinion, and a number of teeth of each of the plurality of fifth pinions is less than the number of teeth of the fourth pinion.

* * * * *